United States Patent [19]

Barylski

[11] 4,214,412

[45] Jul. 29, 1980

[54] PANEL HOLDER AND FASTENER FOR HOME, COMMERCIAL AND INDUSTRIAL USE

[76] Inventor: Gary S. Barylski, Queen of the Lakes, R.D. #1, Huron, Ohio 44839

[21] Appl. No.: 966,275

[22] Filed: Dec. 4, 1978

[51] Int. Cl.² .............................................. B60R 27/00
[52] U.S. Cl. ................................................... 52/169.12
[58] Field of Search ...................... 52/169.12, DIG. 3; 280/768

[56] References Cited

U.S. PATENT DOCUMENTS

| | | | |
|---|---|---|---|
| 3,106,411 | 10/1963 | Holmes | 52/DIG. 3 |
| 3,834,109 | 9/1974 | Iacona | 52/DIG. 3 |

Primary Examiner—John E. Murtagh

[57] ABSTRACT

A framework and a plurality of panels supported on the framework, for being installed between a lower edge of a mobile home body and the ground so as to enclose a storage space under the mobile home; the framework including vertical channels in which the panels slide up and down, for access to the storage space.

1 Claim, 5 Drawing Figures

U.S. Patent  Jul. 29, 1980  4,214,412
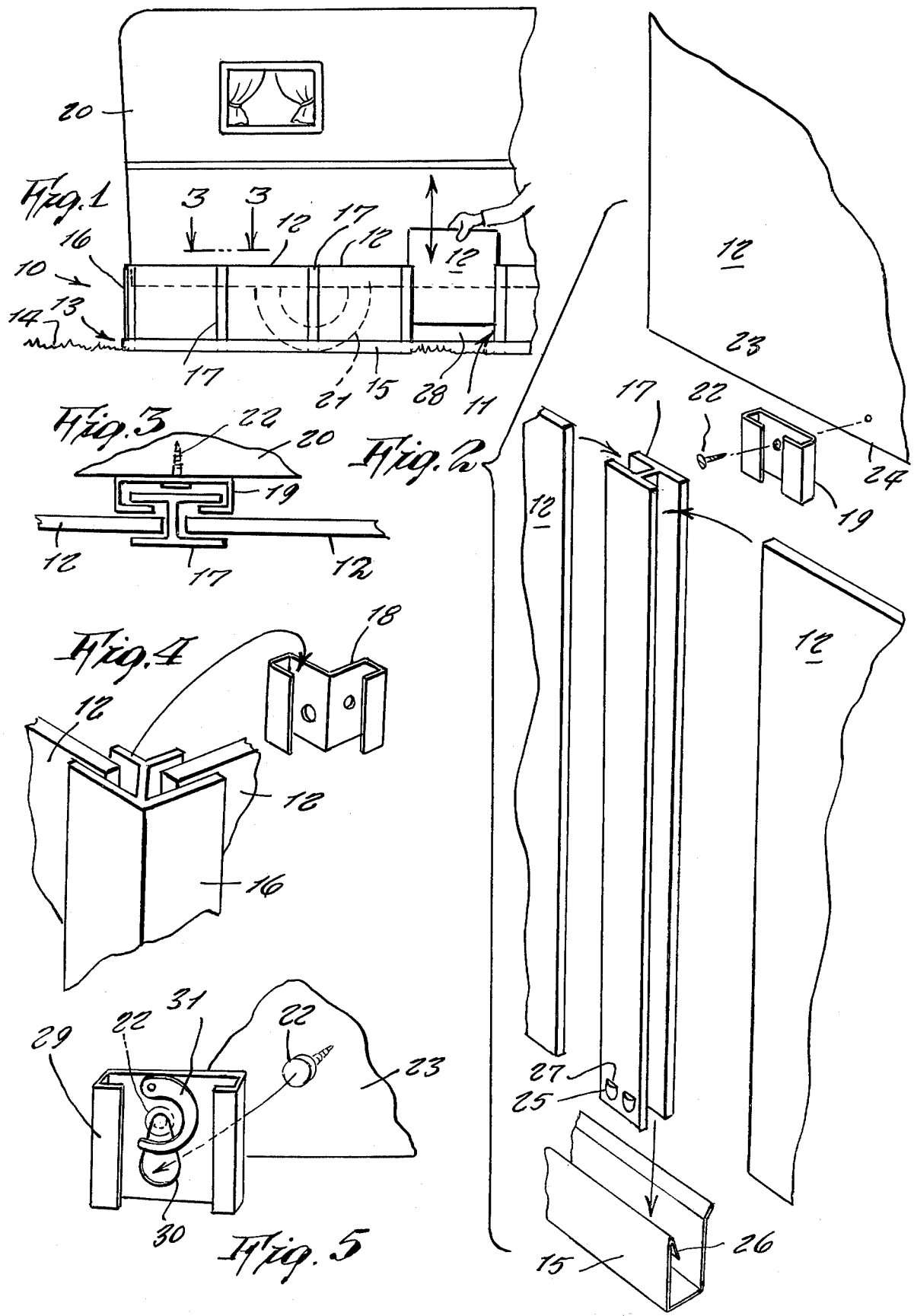

PANEL HOLDER AND FASTENER FOR HOME, COMMERCIAL AND INDUSTRIAL USE

This invention relates generally to accessories for mobile homes.

It is well known that many people live permanently in mobile homes, and who, instead of constantly traveling upon highways, may occassionally settle down in one place for a more lengthy residency, and during which time they wish to make their surroundings more attractive, so that their mobile home has the general appearance of a conventional, stationary dwelling. In view of the fact that the body of a mobile home is raised off the ground by wheels, a space is visible therebelow which prevents a satisfactory change in appearance.

Accordingly, it is a principal object of the present invention to provide a structure that is detachably attachable around a lower edge of a mobile home body and extending down to the ground so as to form an attractive skirt therearound giving a mobile home the appearance of a permanently stationary home.

Another object of this invention is to provide a structure that can be readily disassembled and stored away in a minimum space whenever the mobile home is intended for traveling use.

Yet another object of this invention is to provide a structure which converts a space under the mobile home into a closed storage space for the storage of various equipment so as to be protected from weather and from visual exposure which may tempt theft.

Yet another object of this invention is to provide a structure which includes a plurality of vertically slidable panels all around so as to allow easy access to any part of the storage space.

Yet a further object of this invention is to provide a structure that is adaptable for practical use for home, commercial and industrial use.

Other objects are to provide a panel holder and fastener structure which is simple in design, inexpensive to manufacture, rugged in construction, easy to use and efficient in operation.

These, and other objects will be readily evident upon a study of the following specification and the accompanying drawing wherein:

FIG. 1 is a fragmentary side view of a mobile home, showing the present invention installed therearound.

FIG. 2 an exploded perspective view of the invention components.

FIG. 3 is an enlarged fragmentary top view taken on line 3—3 of FIG. 1.

FIG. 4 is a fragmentary perspective view of a corner channel construction.

FIG. 5 shows a modified design of fastening clips which simply snap on a screw permanently secured in a side of the mobile home, so as to eliminate the need for screwing a screw each time that the invention is to be installed; and the clip having a pivotable lock so as to prevent the clip falling off the screw when a panel is being raised.

Referring now to the drawing in greater detail, and more particularly to FIGS. 1 through 4 thereof, the reference numeral 10 represents a panel holder and fastener structure according to the present invention wherein there is a stationary framework 11, and a plurality of panels 12, that are vertically slidable in the framework.

The framework includes a base frame 13 that may be rested upon a surface of the ground 14, and accordingly includes four horizontal channel beams 15. The framework also includes four vertically extending corner posts 16, and a plurality of vertically extending H channels 17, positioned between the corner posts. The upper ends of the corner posts and the H channels are supported in brackets 18 and 19 respectively, that are detachably mounted to a body of a mobile home 20, mounted upon wheels 21. The brackets are secured by screws 22 to the body outer side wall 23, and near a lower edge 24 thereof. The brackets are shaped so that the posts and H channels are slided down therein. Sidewardly extending protrusions 25 formed on outer sides of the posts and H channels, serve to snap under an inwardly extending, angular lip 26 formed along a top edge of the horizontal channels 15 so as to rigidly lock the same together and make the framework rigid. The protrusions 25, include horizontal top surfaces 27 that abut the lip underside.

The posts and H channels are spaced apart so that flat panels 12 may be slided down therebetween, as shown in FIG. 1, so as to thus complete a skirt or wall around the periphery of a mobile home and which extends from the mobile home body down to the ground, thus completely enclosing a space 28 located under the vehicle, and which thus can be used as a hidden storage space. The lower ends of the panels rest inside the horizontal channels.

In use, by simply sliding upward any of the panels, access is provided to any portion of the storage space.

All the components of the present invention may be made of any suitable materials, such as rigid plastic, so as to be relatively inexpensive, durable and attractive in any color.

In FIG. 5, a modified design of fastening bracket 29 is shown which eliminates the need for screwing or unscrewing the screws 22 in the vehicle body each time the structure is used. In this design, the bracket 29 includes a bayonet slot 3D for receiving the head of the screw therethrough. A freely pivotable C-shaped bar 31 swings down under the screw head and locks it inside the narrow end of the bayonet slot, thus securing the bracket on the vehicle body.

While various changes may be made in the detail construction, it is understood that such changes will be within the spirit and scope of the present invention as is defined by the appended claims.

What I now claim is:

1. A panel holder and fastener assembly, comprising, in combination, a stationary framework securable around a peripheral lower edge of a mobile home body or other home, commercial or industrial structure, and a plurality of vertically slidable panels supported in said framework; said framework comprising a horizontal base frame of channels upon the ground and a plurality of corner posts and intermediate "H" channels extending vertically therebetween, said corner posts and "H" channels each having a vertical groove on opposite side edges thereof, said panels being slidable in said grooves; each said horizontal channel including an inwardly lip along one upper edge thereof, and said posts and "H" channels each including sideward protrusions that snap-fit under said lip; upper ends of said posts and "H" channels being supported in brackets secured to said mobile home body; said brackets including a pivotable locking bar for locking under a screw head.

* * * * *